(12) United States Patent
Ide

(10) Patent No.: US 6,363,220 B1
(45) Date of Patent: Mar. 26, 2002

(54) CAMERA AND AUTOFOCUS APPARATUS

(75) Inventor: Masataka Ide, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/527,101

(22) Filed: Mar. 16, 2000

(30) Foreign Application Priority Data

Mar. 16, 1999 (JP) .......................................... 11-070101

(51) Int. Cl.[7] .............................................. G03B 13/36
(52) U.S. Cl. ........................................ 396/98; 348/345
(58) Field of Search ........................... 396/93, 104, 89, 396/133, 125, 98; 250/201.2, 201.6, 201.7, 201.8; 345/345, 349, 350

(56) References Cited

U.S. PATENT DOCUMENTS

| 4,696,558 A | * | 9/1987 | Karasaki et al. ............. 396/104 |
| 4,835,561 A | * | 5/1989 | Matsui .................... 396/104 X |
| 5,469,239 A | * | 11/1995 | Ishida et al. ............. 396/125 X |

FOREIGN PATENT DOCUMENTS

| JP | 58-86504 | 5/1983 |
| JP | 63-168613 | 7/1988 |
| JP | 9-274130 | 10/1997 |

* cited by examiner

*Primary Examiner*—W. B. Perkey
(74) *Attorney, Agent, or Firm*—Straub & Pokotylo; John C. Pokotylo

(57) ABSTRACT

A low-cost and space-saving focus adjusting apparatus which accurately performs focus adjustment by correcting chromatic aberration in focus detecting operation. A digital camera including a photographing lens and a color imaging element, according to the present invention, comprises a focus detecting light-receiving sensor for receiving an object light beam passed through the photographing lens, a correcting section for calculating, based on an output from the color imaging element, a correction value for correcting a detection error due to chromatic aberration of the focus detecting light-receiving sensor, a focus detecting section for detecting a focus adjusting state of the photographing lens based on an output from the focus detecting light-receiving sensor, and a control section for driving the photographing lens based on an output from the focus detecting section and an output from the correcting section.

31 Claims, 11 Drawing Sheets

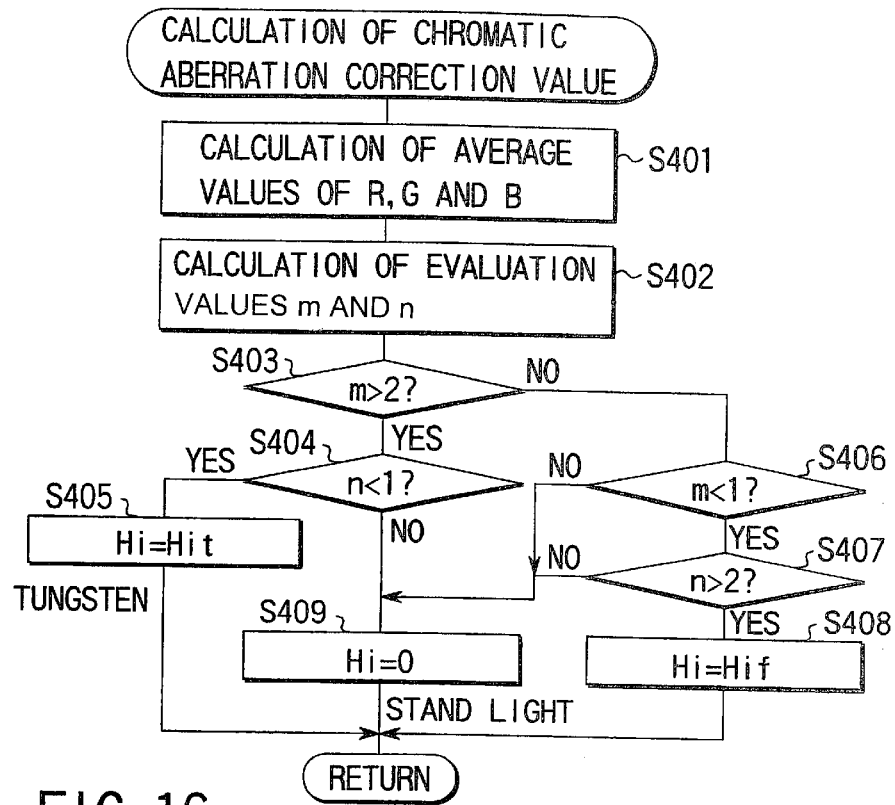
FIG. 16
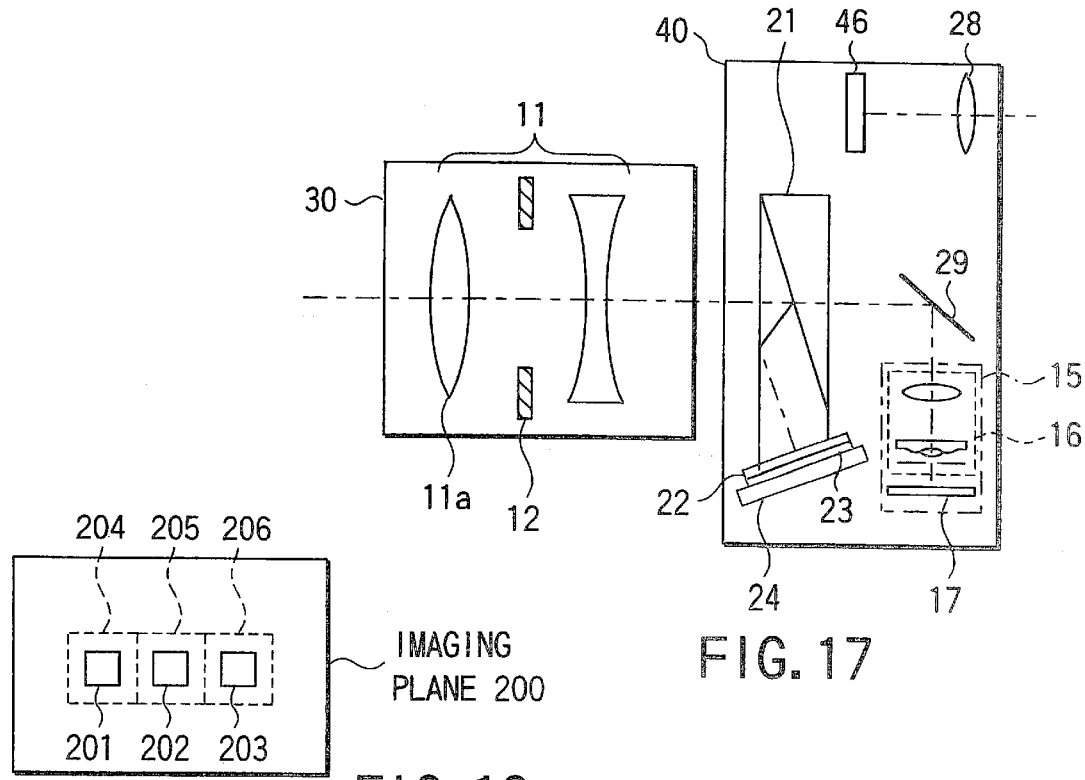
FIG. 17
FIG. 18

CAMERA AND AUTOFOCUS APPARATUS

CROSS-REFERENCE TO RELATED APPLICATION

This application is based upon and claims the benefit of priority from the prior Japanese Patent Application No. 11-070101, filed Mar. 16, 1999, the entire contents of which are incorporated herein by reference.

BACKGROUND OF THE INVENTION

The present invention relates to an autofocus apparatus and a camera.

It is conventionally known that, in a focus adjusting apparatus using a TTL (Through-the-lens) phase contrast detecting method, the focus adjusting accuracy is deteriorated under a specific light source, since chromatic aberration occurs in accordance with the wavelength component of an object light beam.

To cope with the above problem, according to Jpn. Pat. Appln. KOKAI Publication No. 63-168613, a color temperature detecting light-receiving element is provided on the IC chip on which an AF sensor IC serving as a focus detecting light-receiving element is formed. The color temperature detecting light-receiving element measures a color temperature and corrects chromatic aberration.

In the apparatus disclosed in Jpn. Pat. Appln. KOKAI Publication No. 58-86504, a focus detection error due to a color temperature in a focus detecting section including an AF sensor is corrected by means of an output from color temperature measuring means including a light receiving element, a processing circuit and an optical system. The color temperature measuring means are provided separately from the AF sensor IC serving as a focus detecting light-receiving element.

In recent years, single-lens reflex digital cameras using the TTL phase contrast detecting method are sold on the market ("Shashin Kogyo (Photographic Industry)", May 1996, pages 42 and 51). In a camera of this type, a light receiving element, a processing circuit and an optical system only for use in color temperature detection are provided separately. White balance is adjusted on the basis of the detected color temperature information.

Jpn. Pat. Appln. KOKAI Publication No. 9-274130 also discloses a digital camera using the TTL phase contrast detecting method.

However, according to the art disclosed in Jpn. Pat. Appln. KOKAI Publication No. 63-168613, a color filter attachment step is required in the process of forming an IC. Therefore, the number of steps is increased, resulting in an increase in costs.

Further, since the apparatus disclosed in Jpn. Pat. Appln. KOKAI Publication No. 58-86504 has the color temperature detecting section for exclusive use, it is necessary to separately provide a light-receiving element, an optical system and a processing circuit only for use in color temperature detection. Therefore, the conventional art has problems that the cost is increased and an additional mounting space is required.

In the single-lens reflex digital cameras, color temperature detecting information is used for white balance adjustment, but not for correction of chromatic aberration in the focus adjustment.

In a digital camera using the TTL phase contrast detecting method disclosed in Jpn. Pat. Appln. KOKAI Publication No. 9-274130, correction of chromatic aberration in the focus adjustment is not taken into consideration.

BRIEF SUMMARY OF THE INVENTION

The present invention was made in consideration of the above problems of the conventional art. Its object is to provide a camera comprising a focus adjusting apparatus which can perform accurate focus adjustment by correcting chromatic aberration in focus detection.

To achieve the above object, according to a first aspect of the present invention, there is provided a camera including a photographing lens and a color imaging element, comprising: an autofocus sensor for receiving an object light beam passed through the photographing lens; a focus detecting apparatus for detecting a focus adjusting state of the photographing lens based on an output from the autofocus sensor; a correction calculating circuit for calculating, based on an output from the color imaging element, a correction value for correcting a detection error due to chromatic aberration of the focus detecting apparatus; and a lens driving apparatus for driving the photographing lens based on an output from the focus detecting apparatus and an output from the correction calculating circuit.

According to a second aspect of the present invention, there is provided a camera comprising: a focus detecting light-receiving sensor for receiving an object light beam passed through a photographing lens and a separator lens; a focus detecting circuit for detecting a focus state of the photographing lens based on an output from the focus detecting light-receiving sensor; an imaging element for imaging the object light beam passed through the photographing lens; a correcting circuit for correcting an output from the focus detecting circuit based on an imaging output of the imaging element; and a control circuit for performing focus adjustment based on an output from the correction circuit.

According to a third aspect of the present invention, there is provided a camera including a photographing lens and a color imaging element, comprising: an autofocus sensor for receiving an object light beam passed through the photographing lens; focus detecting means for detecting a focus adjusting state of the photographing lens based on an output from the autofocus sensor; correction calculating means for calculating, based on an output from the color imaging element, a correction value for correcting a detection error due to chromatic aberration of the focus detecting means; and a lens driving apparatus for driving the photographing lens based on an output from the focus detecting means and an output from the correction calculating means.

According to a fourth aspect of the present invention, there is provided a camera comprising: a focus detecting light-receiving sensor for receiving an object light beam passed through a photographing lens and a separator lens; focus detecting means for detecting a focus state of the photographing lens based on an output from the focus detecting light-receiving sensor; an imaging element for imaging the object light beam passed through the photographing lens; correcting means for correcting an output from the focus detecting means based on an imaging output of the imaging element; and control means for performing focus adjustment based on an output from the correcting means.

According to a fifth aspect of the present invention, there is provided a camera having an autofocus apparatus, comprising: an autofocus sensor for receiving an object light beam passed through a photographing lens; defocus calculating means for calculating an amount of defocus based on an output from the autofocus sensor; a memory for storing a plurality of correction values to correct a detection error due to chromatic aberration of the autofocus apparatus; a color imaging element for imaging an object; selecting means for selecting at least one of the plurality of correction values stored in the memory based on color information output from the color imaging element; defocus correcting means for correcting the amount of defocus by the correction value selected by the selecting means; and a lens driving apparatus for driving the photographing lens based on an output from the defocus correcting means.

According to a sixth aspect of the present invention, there is provided an autofocus apparatus of a camera, comprising: an autofocus sensor; defocus calculating means for calculating an amount of defocus based on an output from the autofocus sensor; a memory for storing a plurality of correction values to correct a detection error due to chromatic aberration of the autofocus sensor; a color imaging element; color temperature determining means for determining a color temperature of an object light beam based on an output from the color imaging element; selecting means for selecting at least one of the plurality of correction values stored in the memory based on an output from the color temperature determining means; and defocus correcting means for correcting the amount of defocus by the correction value selected by the selecting means.

According to a seventh aspect of the present invention, there is provided a camera comprising: a photographing lens for focusing an object light beam; a color imaging element for receiving the object light beam; an autofocus sensor for receiving the object light beam passed through the photographing lens; a focus detecting section for detecting a focus adjusting state of the photographing lens based on an output from the autofocus sensor; a correcting section for correcting a detection error due to chromatic aberration of the focus detecting section based on an output from the color imaging element; and a lens driving section for driving the photographing lens based on an output from the focus detecting section and an output from the correcting section.

According to an eighth aspect of the present invention, there is provided a camera comprising: a photographing lens for focusing an object light beam; a color imaging element, having a plurality of color temperature detecting regions, for receiving the object light beam; an autofocus sensor for receiving the object light beam passed through the photographing lens; a focus detecting section, having a plurality of focus detecting areas, for detecting a focus adjusting state of the photographing lens based on an output from the autofocus sensor in each area; a correcting section for calculating a color temperature evaluation value based on an image signal in a color temperature detecting region, and correcting a detection error due to chromatic aberration of the focus detecting section based on the color temperature evaluation value; and a lens driving section for driving the photographing lens based on an output from the focus detecting section and an output from the correcting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 is a flowchart for explaining in detail a sequence of calculation of a chromatic aberration correction value executed in a chromatic aberration correction value calculating section 50;

FIG. 17 is a diagram showing a structure of an optical system of a digital camera according to a second embodiment of the present invention;

FIG. 18 is a diagram showing a layout of a photographing screen of the second embodiment;

DETAILED DESCRIPTION OF THE INVENTION

Figure 1:
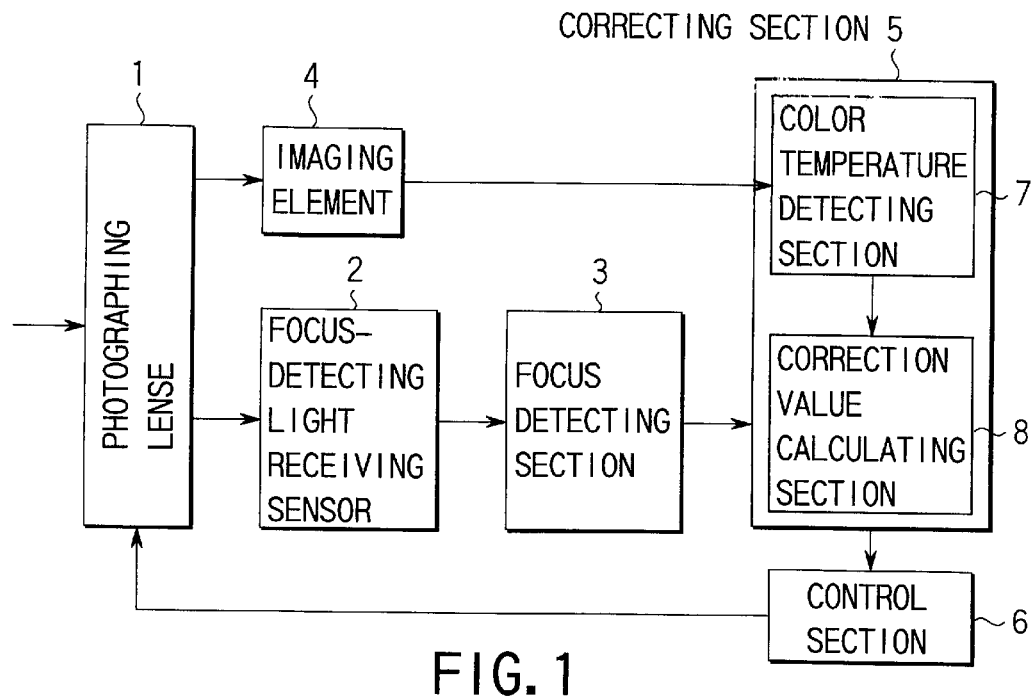
FIG. 1 is a conceptual diagram of a digital camera including a focus adjusting apparatus of the present invention.

FIG. 1 is a conceptual diagram of a digital camera including a focus adjusting apparatus of the present invention.

As shown in FIG. 1, the digital camera comprises a photographing lens 1 for focusing an object light beam onto a predetermined position. It also comprises, in the rear of the photographing lens 1, a focus detecting light-receiving sensor 2 for receiving a pupil-divided object light beam passed through the photographing lens 1, and an imaging element 4 for imaging the object light beam passed through the photographing lens 1. The focus detecting light-receiving sensor 2 is connected to a focus detecting section 3 for detecting a focusing state of the photographing lens 1 on the basis of an output from the focus detecting light-receiving sensor 2. An output of the focus detecting section 3 is connected to an input of a correcting section 5 for correcting the output of the focus detecting section 3. An output of the imaging element 4 is also connected to an input of the correcting section 5. The correcting section 5 includes a color temperature detecting section 7 for detecting a color temperature on the basis of the output of the imaging element 4, and a correction value calculating section 8 for calculating a chromatic aberration correction value on the basis of an output of the color temperature detecting section 7. An output of the correcting section 5 is connected to an input of a control section 6. An output of the control section 6 is connected to the photographing lens 1 via a mechanical system (not shown).

The pupil-divided object light beam incident on the above structure through the photographing lens 1 is received by the focus detecting light-receiving sensor 2. An output signal from the focus detecting light-receiving sensor 2 is input to the focus detecting section 3. In the focus detecting section 3, the focusing state of the photographing lens 1 is detected. The object light beam incident through the photo-graphing lens 1 is also input to the imaging element 4 and imaged therein.

In the correcting section 5, a focus detecting output of the focus detecting section 3 is corrected on the basis of an output from the imaging element 4. At this time, the color temperature detecting section 7 in the correcting section 5 detects the color temperature of the object based on the output from the imaging element 4. The correction value calculating section 8 in the correcting section 5 calculates a chromatic aberration correction value based on the output from the color temperature detecting section 7.

Then, the control section 6 performs predetermined focus adjustment based on a corrected focus detecting output, output from the correcting section 5.

Figure 2:
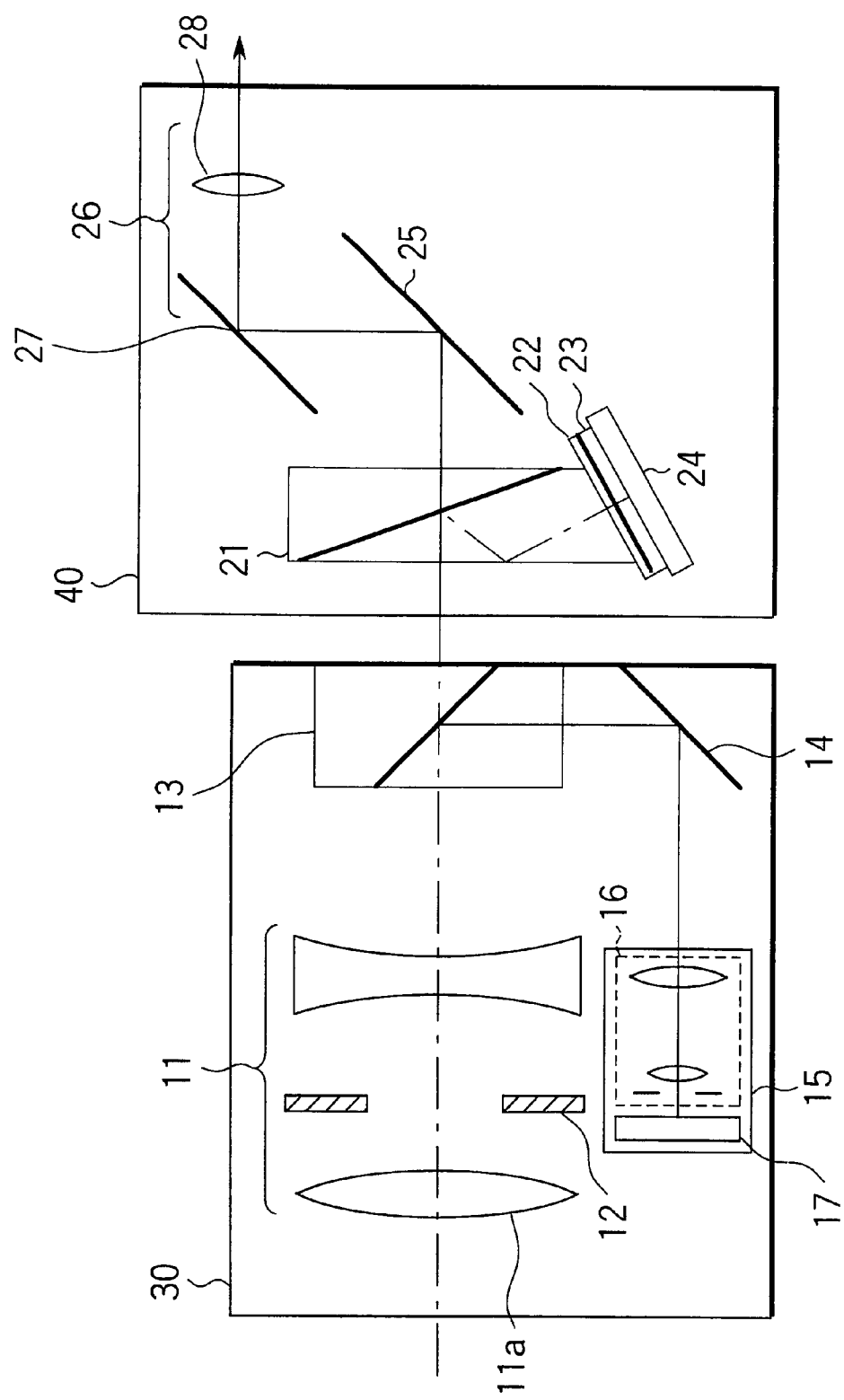
FIG. 2 is a diagram showing a structure of the optical system of a digital camera according to a first embodiment of the present invention.

FIG. 2 shows a structure of the optical system of the digital camera having a focus adjusting apparatus according to an embodiment of the present invention.

As shown in FIG. 2, the digital camera of this embodiment has an interchangeable lens 30 and a camera body 40. The interchangeable lens 30 is attachable to and detachable from the camera body 40.

The interchangeable lens 30 includes a photographing optical system 11 having a focus adjusting lens 11a, a lens stop 12, etc. in predetermined positions. It also includes, in the rear of the photographing optical system 11, a beam splitter 13 for reflecting the object light beam downward and passing part of the light therethrough toward the camera body 40. A mirror 14 is located in the path of light reflected by the beam splitter 13. A focus detecting section 15 including a focus detecting optical system 16, an AF sensor 17, etc. is located in the path of light reflected by the mirror 14. In this embodiment, the focus detecting section 15 employs a phase contrast detecting method. The lens stop 12 can maintain a predetermined aperture and also has a shutter function for completely blocking off light.

The camera body 40 includes a beam splitter 21 in a predetermined position. A mirror 25 is arranged in a path of the light passed through the beam splitter 21. A finder optical system including a mirror 27 and an eyepiece 28 is located in the path of light reflected by the mirror 25. Further, an infrared cut filter 22, an optical low pass filter (LPF) 23 and a charge coupled device (CCD) 24 are located in the path of light reflected by the beam splitter 21.

In the above structure, the light beam from the object is passed through the photographing optical system 11. The light beam is split by the beam splitter 13, so that a part thereof is guided to the camera body 40 and the other part is guided to the focus detecting section 15 via the mirror 14. A part of the object light beam guided to the camera body 40 through the photographing optical system 11 is passed through the beam splitter 21 and guided to the CCD 24 through the infrared cut filter 22 for cutting an infrared component and the optical LPF 23 for reducing moiré fringes. The other part of the object light beam is reflected by the mirror 25 and thereafter guided to the finder optical system 26 including the mirror 27 and the eyepiece 28.

Figure 3A:
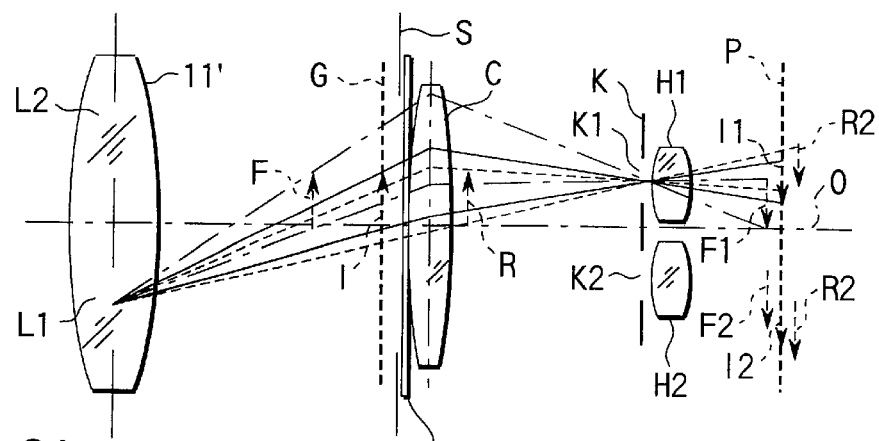
FIG. 3A is a diagram showing details of the structure of a focus detecting optical system 16 for guiding a light beam from an object to an photoelectric converting element P of an AF sensor 17 in the focus detecting section 15.

FIG. 3A is a diagram showing details of the structure of the focus detecting optical system 16 for guiding the light beam from the object to an photoelectric converting element P of the AF sensor 17 in the focus detecting section 15.

In FIG. 3A, a reference numeral 11' denotes a photographing lens; RF an infrared cut filter; S a field mask; C a condenser lens; K a pupil mask having apertures K1 and K2 arranged substantially symmetrically with respect to the optical axis of the photographing lens 11' ; and H1 and H2 separator lenses respectively arranged in the rear of the apertures K1 and K2 of the pupil mask. The infrared cut filter RF removes infrared having a wavelength of 750 nm or longer, i.e., an unnecessary infrared component, so that the adverse influence of chromatic aberration can be minimized.

The object light beam passed through exit pupil regions L1 and L2 of the photographing lens 11' is passed through the field mask S, the infrared cut filter RF, the condenser lens C, the apertures K1 and K2 of the pupil mask K and the separator lenses H1 and H2, and re-imaged on the photoelectric converting element P of the AF sensor 17.

In the case where the photographing lens 11' is focused, i.e., an object image I is formed on an imaging plane G, the object image I is re-imaged by the condenser lens C and the separator lenses H1 and H2 on a second imaging plane P (on the photoelectric converting element P of the AF sensor 17) perpendicular to the optical axis O. As a result, a first image I1 and a second image I2 are formed.

In the case where the photographing lens 11' is in the front focus state, i.e., an object image F is formed in front of the imaging plane G, the object image F is re-imaged on a plane perpendicular to the optical axis O as a first image F1 and a second image F2, which are closer to the optical axis O than the first and second images F1 and F2.

In the case where the photographing lens 11' is in the rear focus state, i.e., an object image R is formed in the rear of the imaging plane G, the object image R is re-imaged on a plane perpendicular to the optical axis O as a first image R1 and a second image R2, which are farther from the optical axis O than the first and second images F1 and F2.

In this embodiment, the distance between the first and the second images is detected, thereby detecting the focusing state of the photographing lens 11', including the front focus and the rear focus states. More specifically, the distributions of light intensity of the first and the second images are obtained on the basis of object image data output from the AF sensor 17, thereby measuring the distance between the two images.

The AF sensor 17 is generally formed of a material having comparatively flat spectral sensitivity within the range of visible light, for example, silicon. Therefore, the imaged point of a long wavelength component r2 (e.g., $\lambda$=720 nm) in the visible light imaged by the photographing lens 11' is located in the rear of the imaging plane G due to epaxial chromatic aberration of the photographing lens 11' (FIG. 3B).

Figure 3B:
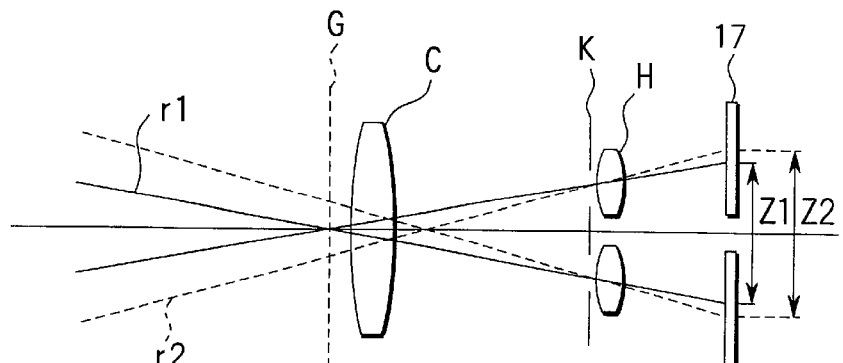
FIG. 3B is a diagram showing an image interval Z2 corresponding to an object including a lot of a long wavelength component reflected light.

Therefore, as shown in FIG. 3B, a distance Z2 between the images corresponding to the object 9 including a reflected light component of a long wavelength is greater than a distance Z1 between images corresponding to the object including a reflected right component of visible light r1 (the center of gravity: $\lambda$=560 nm).

Figure 4:
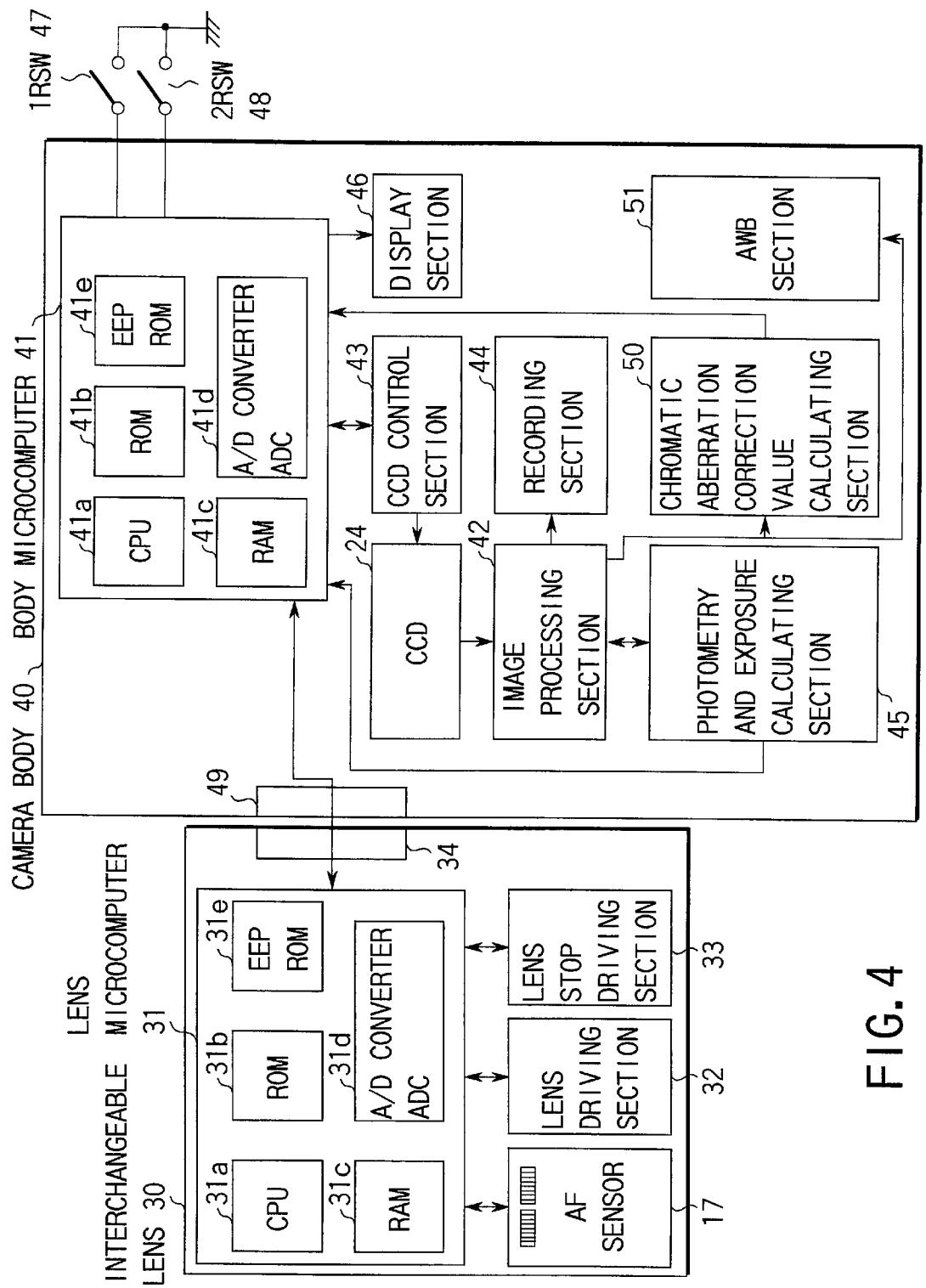
FIG. 4 is a diagram showing a structure of a control system of the digital camera of the first embodiment.

FIG. 4 is a diagram showing control systems of the interchangeable lens 30 and the camera body 40 of the digital camera of the first embodiment.

First, the control system of the interchangeable lens 30 will be described in detail.

In FIG. 4, a lens microcomputer 31 is a controller for controlling the interchangeable lens 30. It includes a central processing unit (CPU) 31a, a read only memory (ROM) 31b, a random access memory (RAM) 31c and an analog/digital (A/D) converter ADC 31d. The lens microcomputer 31 further includes a nonvolatile memory, EEPROM 31e, which stores correction data for every interchangeable lens in connection with focus adjustment control and the like.

The lens microcomputer 31 executes a series operations in accordance with a sequence program stored in the ROM 31b.

The lens microcomputer 31 controls the operation of the AF sensor 17, which is a part of the focus detecting section 15. Sensor data (object image data) output from the AF sensor 17 is A/D converted by the A/D converter ADC 31d in the lens microcomputer 31 and thereafter stored in the RAM 31c.

The lens microcomputer 31 executes a focus detecting operation based on the aforementioned sensor data and a correcting operation based on the correction data transmitted from a body microcomputer 41 in the camera body 40. Thus, it calculates an amount of movement of the focus adjusting lens 11a, the direction of the movement, the speed of the movement, etc.

The focus detecting section 15 is set so as to have optimized characteristics, such as a focus detecting accuracy and a defocus detecting range, in accordance with the type of the interchangeable lens 30. A lens driving section 32 drives the focus adjusting lens 11a based on instructions from the lens microcomputer 31. A lens stop driving section 33 drives the lens stop 12 based on instructions from the lens microcomputer 31.

Besides, the interchangeable lens 30 has, in a mount portion to be connected to the camera body 40, a plurality of electrical contacts 34 for communicating the interchangeable lens 30 with the camera body 40.

The control system of the camera body 40 will now be described in detail.

In FIG. 4, the body microcomputer 41 is a controller for controlling the camera body 40. It includes a CPU 41a, a ROM 41b, a RAM 41c and an A/D converter ADC 41d. It executes a series operations in accordance with a sequence program stored in the ROM 41b of the body microcomputer 41.

The body microcomputer 41 further includes an EEPROM 41e, which stores correction data for each body in connection with focus adjustment, photometry, AWB (auto-white balance), stroboscopic light control, etc. The CCD 24 captures an object image formed by the photographing optical system 11 and converts it to an electric signal. An image signal processing section 42 processes the electric signal supplied from the CCD 24 and generates an image signal. A CCD control section 43 outputs a driving signal to the CCD 24 and controls the operations thereof.

Figure 5:
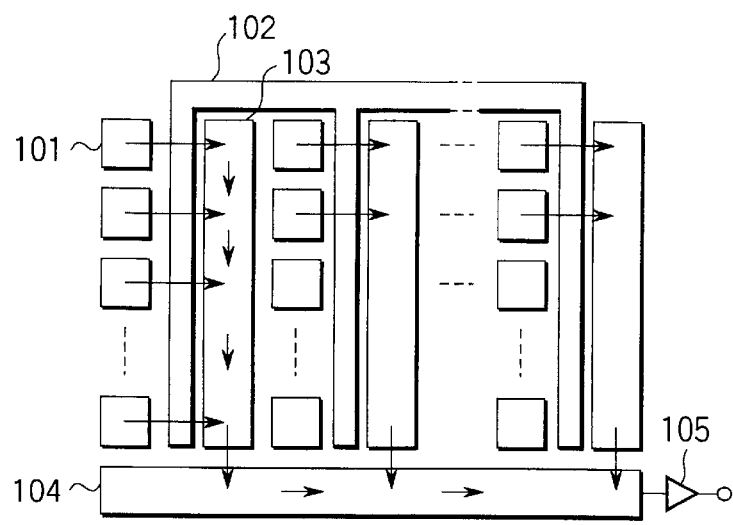
FIG. 5 is a diagram showing details of a CCD 24 shown in FIG. 4.

The CCD 24 is a vertical overflow drain type CCD. FIG. 5 shows details thereof.

The CCD 24 may be an interline transmission CCD of a charge transfer type.

Referring to FIG. 5, the CCD 24 comprises photodiodes 101 arranged two dimensionally in horizontal and vertical directions; a transfer gate 102 for transferring the charges stored in the photodiodes 101 to vertical shift registers 103; the vertical shift registers 103 for successively transferring the transferred charges in the vertical direction; a horizontal shift register 104 for successively transferring in the horizontal direction the charges which have been transferred in the vertical direction by the vertical shift registers; and an output section 105 for converting the charges transferred by the horizontal shift register 104 in the horizontal direction to a voltage signal and outputting the voltage signal.

Color filters are mounted in front of the photodiode 101. They are arranged in the so-called Bayer matrix, as shown in FIG. 7.

Figure 7:
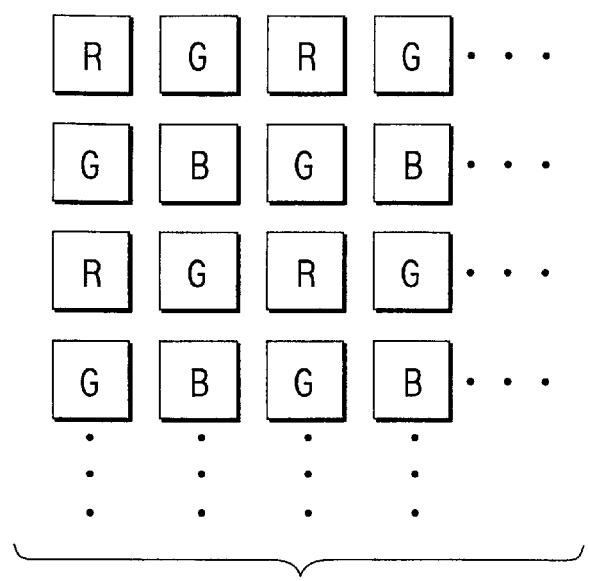
FIG. 7 is a diagram showing arrangement of color filters disposed on the front surface of the photodiode 101.

In FIG. 7, the letters "R", "G" and "B" represent color filters for respectively transmitting red, green and blue light.

Figure 8:
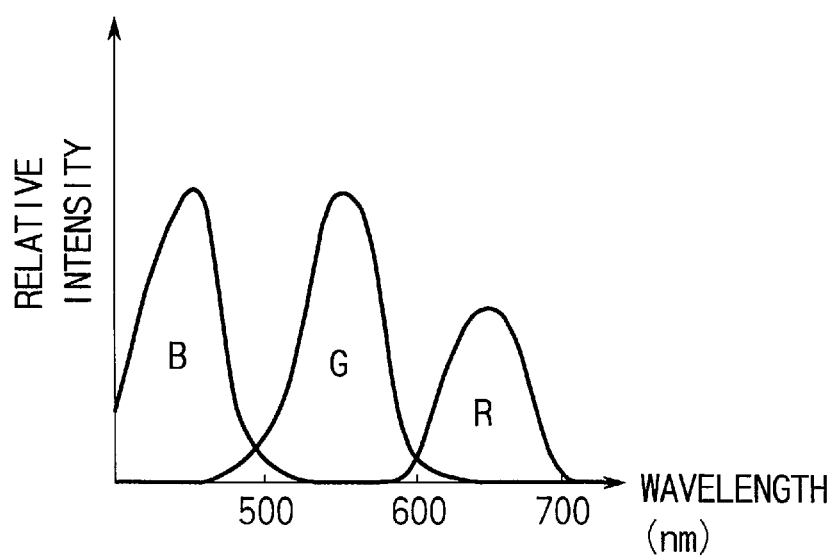
FIG. 8 is a diagram showing spectral sensitivity of pixels corresponding to R, G and B.

The pixels corresponding to the aforementioned lights R, G and B have spectral sensitivities as shown in FIG. 8. In other words, the lights R, G and B have predetermined relative intensities in the wave ranges as shown in FIG. 8.

Figure 6:
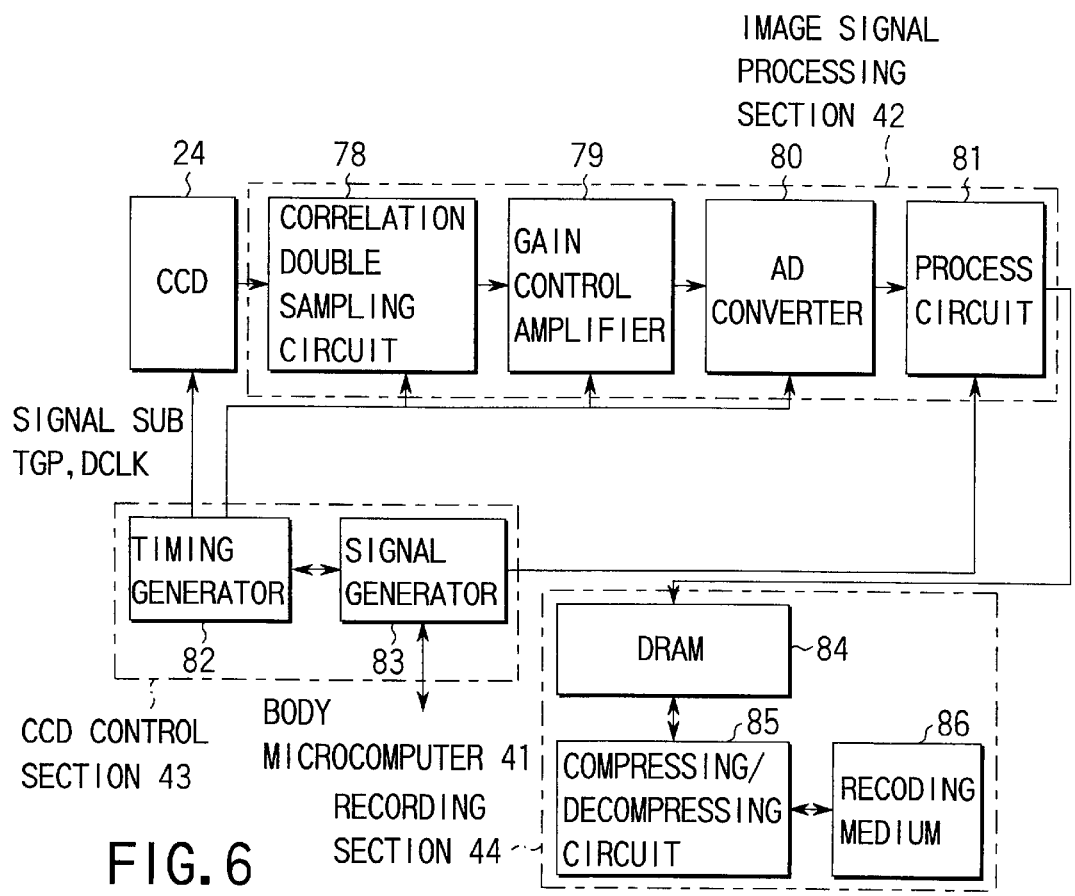
FIG. 6 is a diagram showing details of an image signal processing section 42, a CCD control section 43 and a recording section 44.

The image signal processing section 42 comprises, as shown in FIG. 6, a correlation double sampling circuit (CDS) 78 for removing reset noise or the like from the CCD 24; a gain control amplifier AMP 79 for amplifying an output from the correlation double sampling circuit 78; an A/D converter 80 for A/D converting an output from the gain control amplifier 79 to a digital signal; and a process circuit 81 for subjecting the converted digital image signal to various processes.

The CCD control section 43 comprises, as shown in FIG. 6, a timing generator (TG) 82 for generating a driving signal (e.g., a transmission pulse) for driving the CCD 24, a sample hold pulse for the correlation double sampling circuit 78 and an A/D conversion timing pulse for the A/D converter 80. It also comprises a signal generator (SG) 83 for generating a signal for achieving synchronization between the timing generator 82 and the body microcomputer 41.

The recording section 44 comprises, as shown in FIG. 6, a DRAM 84 for storing an image signal (pixel data) output from the process circuit 81 in the image signal processing section 42; and a compressing/decompressing circuit 85 for compressing the pixel data stored in the DRAM 84 to reduce the length of the data to be stored in a recording medium 86 and decompressing the compressed data read out from the recording medium 86. The recording section 44 also includes the recording medium 86 for recording the aforementioned compressed static image data.

A photometry and exposure calculating section 45 calculates a photometry value and an exposure value on the basis of the image signal output from the image processing section 42. An AWB section 51 automatically controls white balance on the basis of the image signal output from the image processing section 42.

A chromatic aberration correction value calculating section 50 calculates chromatic aberration correction data for focus adjustment on the basis of the image signal output from the image processing section 42. It outputs the calculated chromatic aberration correction data to the body microcomputer 41. The body microcomputer 41 transmit the chromatic aberration correction data to the lens microcomputer 31. The lens microcomputer 31 controls a focus adjusting operation on the basis of the chromatic aberration correction data.

The CCD control section 43 controls an electronic shutter of the imaging element CCD 24 in the imaging time on the basis of a shutter speed output from the photometry and exposure calculating section 45. The body microcomputer 41 transmits to the lens microcomputer 31 aperture data obtained from the exposure value calculated by the photometry and exposure calculating section 45. In the imaging time, the lens microcomputer controls the lens stop 12 in the photographing optical system 11. A display section 46, controlled by the body microcomputer 41, displays an image imaged by the imaging element CCD 24 on an LCD or the like.

A first release switch (1RSW) 47 and a second release switch (2RSW) 48 cooperate with a release button. The 1RSW 47 is turned on by depressing the release button to a first level, and the 2RSW 48 is turned on by subsequently depressing it to a second level.

The body microcomputer 41 executes photometry and AF operations when the 1RSW 47 is on, and exposure and image recording operations when the 2RSW 48 is on. Besides, the camera body 40 has, in a mount portion to be connected to the interchangeable lens 30, a plurality of electrical contacts 49 for communicating the camera body 40 with the interchangeable lens 30.

Figure 9:
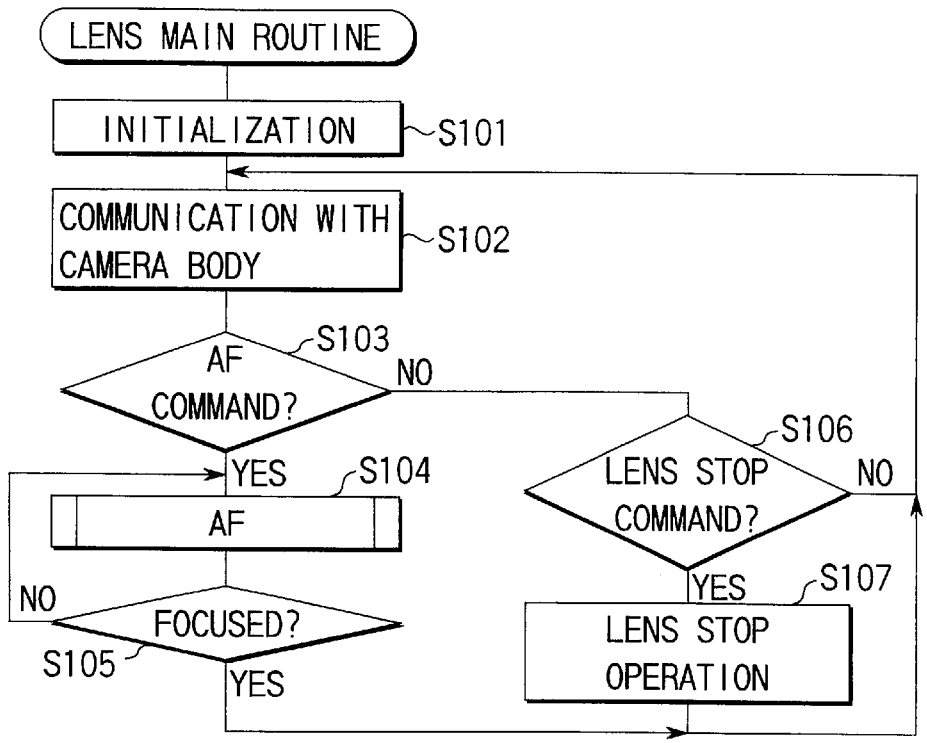
FIG. 9 is a flowchart for explaining in detail a control operation of a lens microcomputer 31 according to the first embodiment.

A control operation of the lens microcomputer 31 will be described in detail with reference to the flowchart of FIG. 9.

Upon a start of the main routine, the lens microcomputer 31 executes initialization of the blocks of the interchangeable lens 30 (step S101). Subsequently, the lens microcomputer 31 performs communication with the body microcomputer 41 on the side of the camera body, so that necessary data can be exchanged (step S101). Correction data used in focus detection include chromatic aberration correction data, flange back deviation data for each body, and data on a focus allowance range in accordance with the pixel size of the imaging element.

Then, it is determined whether the command from the body microcomputer 41 received by the aforementioned communication is an AF command or not (step S103).

If it is determined that the command is an AF command in the step S103, a subroutine "AF" (to be described in detail later) is executed (step S104). In the step S104, the lens is driven and controlled on the basis of the defocus amount calculated from the output of the focus detecting section 15 (phase contrast detecting method). After the AF operation, it is determined whether the lens is focused or not. If the lens is hot focused, the flow returns to the step S104 and the AF operation is continued. If focused, the AF operation is ended and the flow returns to the step S102.

If it is determined that the command is not an AF command in the step S103, the lens microcomputer 31 determines whether the command from the body microcomputer 41 is a lens stop command or not (step S106). If it is determined that the command is a lens stop command in the step S106, the lens microcomputer 31 executes a lens stop operation for setting the lens step 12 to an aperture designated by the communication (step S107). If the command is not a lens stop command, the lens microcomputer 31 enters a command wait state, and the flow returns to the step S102.

Figure 10:
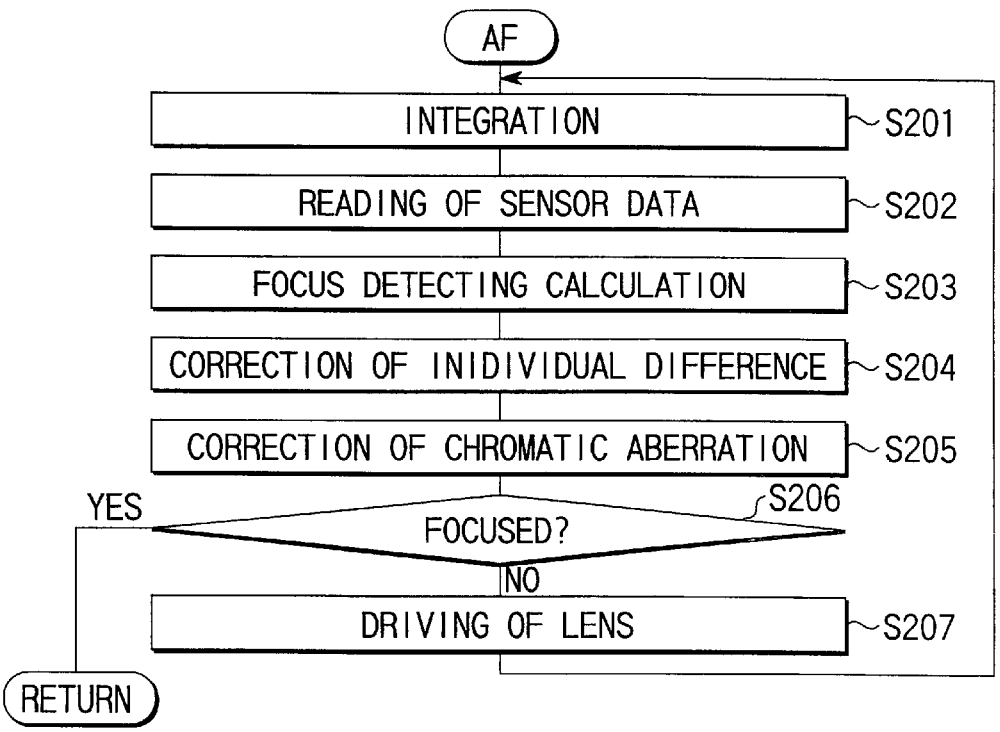
FIG. 10 is a flowchart for explaining in detail a sequence of the subroutine "AF"

The sequence of the subroutine "AF" will be described in detail with reference to the flowchart of FIG. 10.

In this sequence, the lens microcomputer 31 first performs integration control of the AF sensor 17 (step S201), and then reading of sensor data from the AF sensor 17 (step S202). Subsequently, the lens microcomputer 31 executes a focus detecting calculation to calculate an amount of defocus (step S203).

Thereafter, the amount of defocus is corrected through the communication with the body microcomputer 41 on the basis of correction data Hd (defocus correction data) for each body which has been stored in the RAM 31b in the lens microcomputer 31 (step S204).

$$DF''=DF'+Hd \tag{1}$$

The amount of defocus DF' to be corrected is set to represent an amount of defocus detected in sunlight.

Further, the amount of defocus DF' is corrected in consideration of the chromatic aberration on the basis of chromatic correction data Hi (step S205).

$$DF''=DF'+Hi \tag{2}$$

Thereafter, the amount of defocus DF" to be corrected is compared with a focus allowance range Gd written in the RAM 31c, and it is determined whether the amount DF" falls within the focus allowance range Gd (step S206). The focus allowance range Gd is data characteristic of the kind of the camera body.

If it is determined that the amount DF" falls outside the focus allowance range Gd in the step S206, the amount of driving the focus adjusting lens 11a to achieve focus is calculated from the amount of defocus DF' to be corrected, and the focus adjusting lens 11a is driven (step S207).

Subsequently, the flow returns to the step S201, and the operation described above is repeated until the detected amount of defocus DF" falls within the focus allowance range Gd. When the amount of defocus DF" falls within the focus allowance range GD, the flow is returned.

Figure 11:
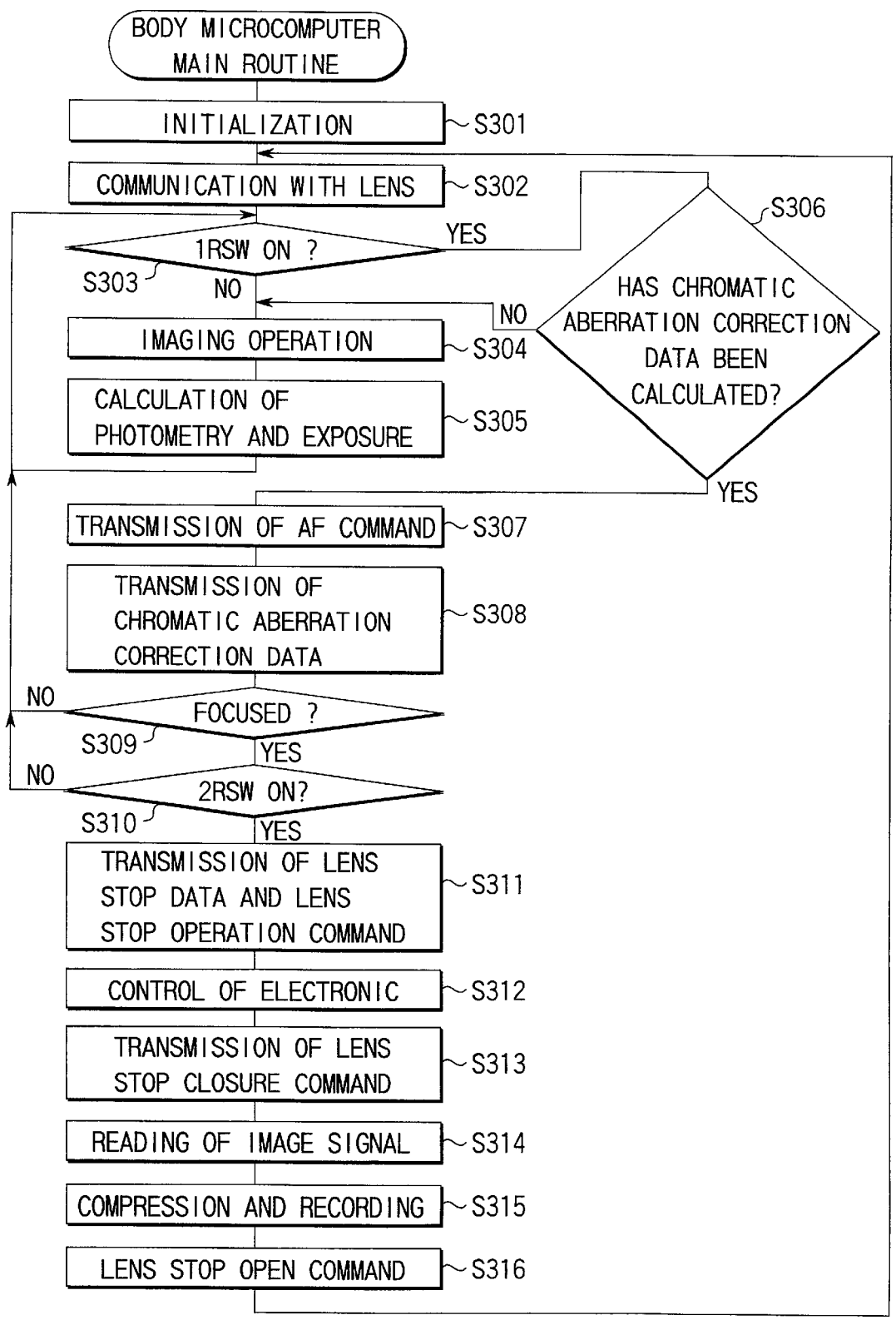
FIG. 11 is a flowchart for explaining in detail a control operation of a body microcomputer 41 in a camera body 40.

A control operation of the body microcomputer 41 in the camera body 40 will now be described with reference to the flowchart of FIG. 11. In the following description, the timing chart of FIG. 12 will be referred to, if necessary.

When a power source SW (not shown) is turned on or a battery is inserted, the microcomputer 41 starts operating to execute a series of sequences stored in the ROM 41b, as will be described below.

Upon a start of the main routine, the body microcomputer 41 executes initialization of the blocks of the camera body 40 (step S301). Subsequently, it performs intercommunication with the lens microcomputer 31 (step S302). In the communication, focus detecting parameters inherent in the camera body are transmitted to the lens microcomputer 31.

The focus detecting parameters include data on the focus allowance range, flange back deviation data for the body, etc.

Subsequently, the body microcomputer 41 detects the state of the 1RSW 47 (step S303). If the 1RSW 47 is off, an imaging operation, i.e., exposure and reading of the CCD 24, is performed (step S304). The photometry and exposure calculating section 45 executes photometry and calculation of an exposure on the basis of the image signal output from the image processing section 42, to calculate a stop control value of the lens stop 12 and an electronic shutter speed of the CCD 24 in the main exposure (image recording) time. Further, the chromatic aberration correction value calculating section 50 calculates a chromatic aberration correction value (step S305), and the flow returns to the step S303.

If the 1RSW 47 is determined to be on in the step S303, it is checked whether the chromatic aberration correction value has been calculated or not (step S306). If the value has not been calculated, the flow advances to the step 304 and the aforementioned operation is performed.

If it is determined that the chromatic aberration correction value has been calculated, the AF command is transmitted to the lens microcomputer 31 (step S307). Further, the chromatic aberration correction value calculated by the chromatic aberration correction calculating section 50 is transmitted to the lens microcomputer 31 (step S308). Then, it is determined whether the lens is focused or not through the intercommunication with the lens microcomputer 31 (step S309). If focused, the flow advances to a step S310. If not, the flow returns to the step S303 and the AF operation is repeated.

In the subsequent step S310, it is detected whether the 2RSW 48 is on. If the 2RSW 48 is off, the flow returns to the step S303, and the AF operation is repeated, until the 2RSW 48 is turned on.

If the 2RSW 48 is on, the body microcomputer 41 transmits lens stop data for exposure to the lens microcomputer 31. The lens microcomputer 31 causes the lens stop driving section 33 to stop down the lens stop 12 to the aperture for the exposure (step S311).

Subsequently, the CCD control section 43 turns off the signal SUB to cause the CCD 24 to start storage and perform exposure (main exposure) with the electronic shutter speed based on the calculated exposure (step S312)

Figure 12:
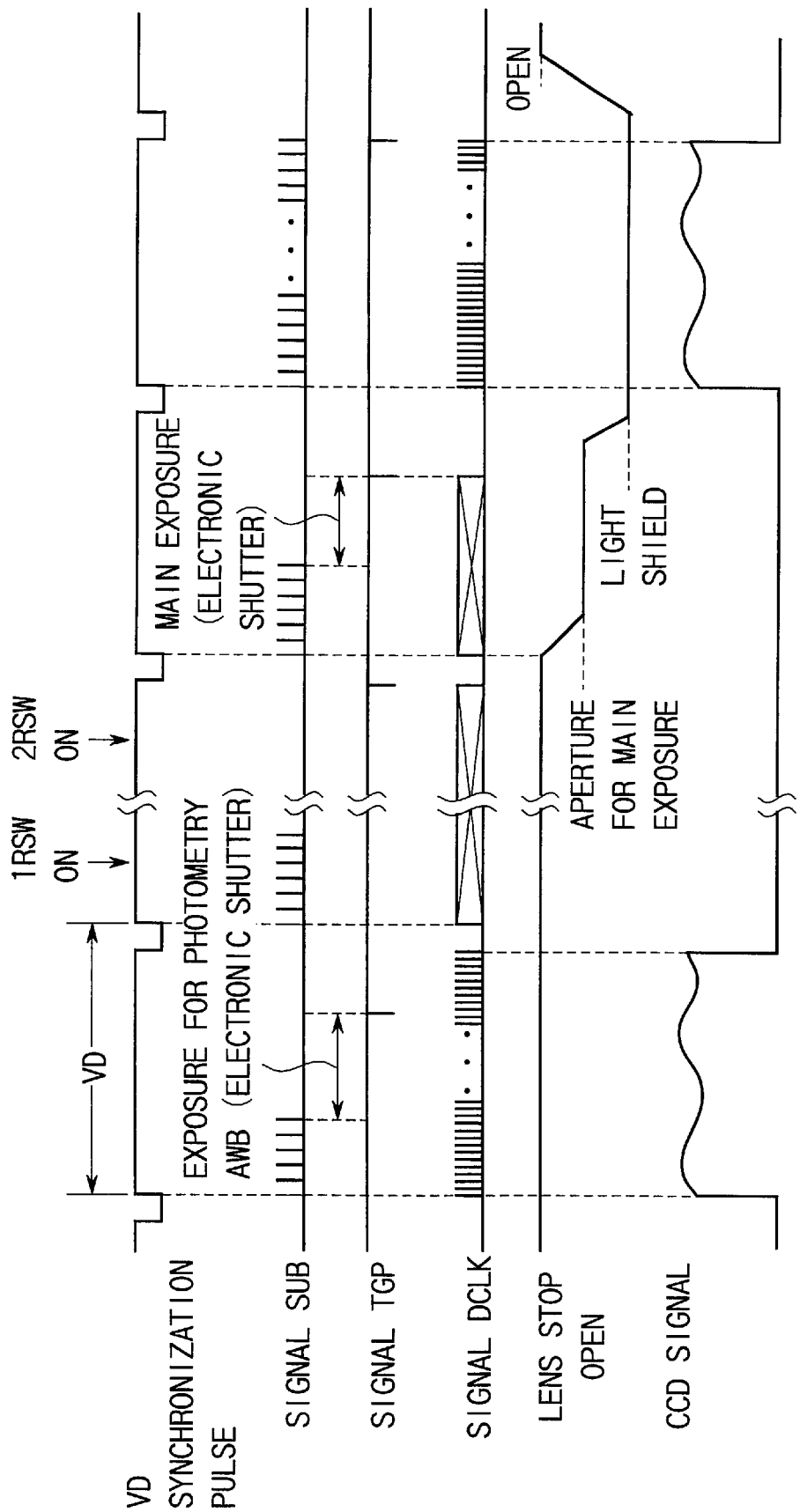
FIG. 12 is a timing chart showing states of various signals concerning the control operation of the body microcomputer 41.

In the electronic shutter operation, the CCD control section 43 generates a transmission pulse TGP at a timing corresponding to the shutter speed, and transfers the charges of the photodiodes 101 to the vertical shift registers 103 (see FIG. 12).

Then, to prevent smears, a lens stop closure command is transmitted to the lens microcomputer 31 to completely close the lens stop 12 and make the CCD 24 shielded from light (step S313). In the state where the CCD 24 is shielded from light, the CCD control section 43 outputs a signal DCLK to the CCD 24 (step S314). The image signal processing section 42 analog-to-digital converts and reads an image signal (CCD signal) output in synchronism with the signal DCLK (see FIG. 12). Further, the read image signal is processed, for example, compressed, and thereafter stored in the recording medium 86 (step 315).

Thereafter, the body microcomputer 41 transmits a lens stop open command to the lens microcomputer 31 to cause the lens stop 12 open (step S316). Thus, a series of imaging operations is completed, the flow returns to the step S302, and operations as described above are repeated.

A method for calculating chromatic aberration correction data will now be described.

First, wavelength characteristics of a representative light source, which cause an influence of chromatic aberration, will be described.

Figure 13:
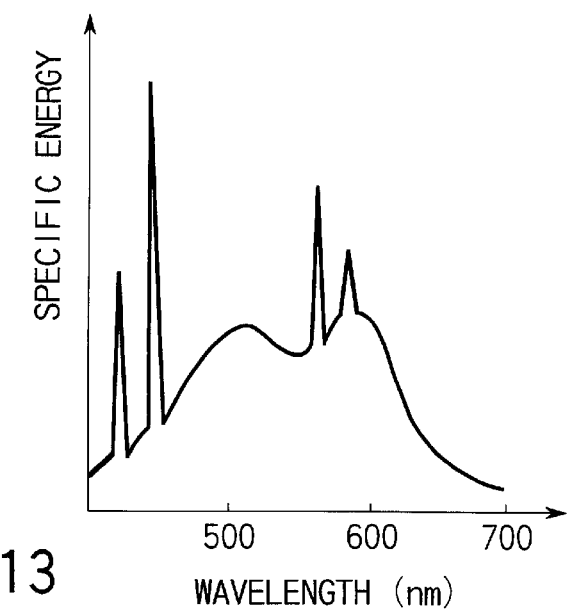
FIG. 13 is a diagram showing the wavelength distribution of a general fluorescent lamp.

FIG. 13 is a diagram showing the wavelength distribution of a general fluorescent lamp. In general, a fluorescent lamp emits light of wavelengths having prominent optical energy, called a bright-line spectrum. In the overall view, the optical energy in the G output is relatively high.

Figure 14:
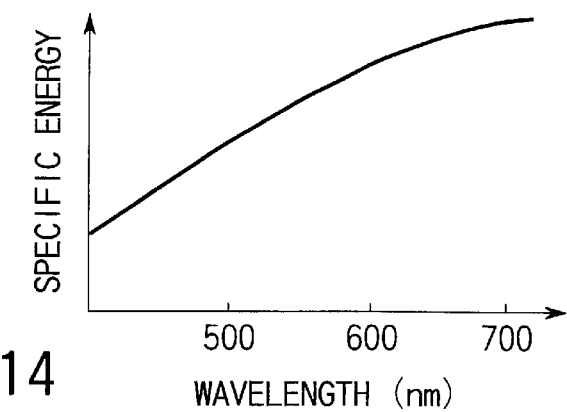
FIG. 14 is a diagram showing the wavelength distribution of a tungsten lamp.

FIG. 14 is a diagram showing the wavelength distribution of a tungsten lamp. Light emitted from the tungsten lamp has a chromatic temperature of about 3500 to 4000° K (Kelvin). The R component thereof has high intensity.

Evaluation values m and n for discriminating the light source based on the chromatic temperature will be described.

Figure 15:
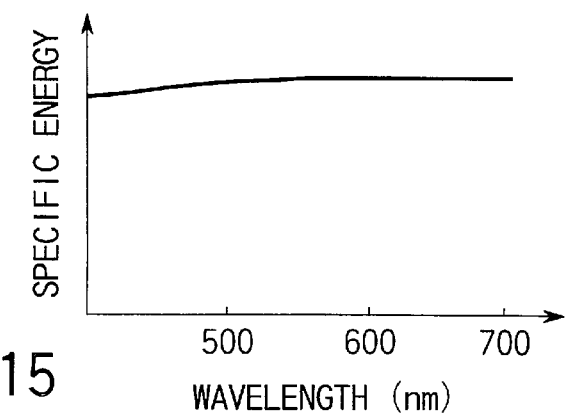
FIG. 15 is a diagram showing the wavelength distribution of a standard light source (color temperature of 5500° K)

It is assumed that m denotes a variable representing the ratio of an R output to a B output of an image signal, m0 denotes the ratio R/B of an R output to a B output in the case of a standard light source (color temperature of 5500° K) as shown in FIG. 15, and m' denotes the ratio R/B of an R output to a B output in the photographing scene.

Under these conditions, the evaluation value m is obtained by the following equation (3):

$$m=m'/m0 \qquad (3).$$

In the equation (3), if the ratio R/B in the photographing scene is twice that in the case of the standard light source, m=2, and if ½, m=0.5.

Next, it is assumed that n denotes the ratio of a G output to B and R outputs of an image signal, n0 denotes the ratio G/(B·R) of a G output to B and R outputs in the case of the standard light source, and n' denotes the ratio G/(B·R) of a G output to B and R outputs in the photographing scene.

Under these conditions, the evaluation value n is obtained by the following equation (4):

$$n=n'/n0 \qquad (4).$$

In the equation, if the ratio G/(B·R) in the photographing scene is twice that in the case of the standard light source, n=2, and if ½, n=0.5.

The values of m0 and n0 are prestored in the EEPROM 41e in the body microcomputer 41. In this embodiment, the chromatic aberration correction value is obtained on the basis of the evaluation values m and n.

Sequences of calculating a chromatic aberration correction value executed in the chromatic aberration correction value calculating section 50 will be described in detail with reference to the flowchart shown in FIG. 16.

Chromatic aberration correction data Hit for a tungsten lamp and chromatic aberration correction data Hif for a fluorescent lamp, recorded in the EEPROM 31e of the lens microcomputer 31, have been stored in the chromatic aberration correction value calculating section 50 through the communication.

First, the chromatic aberration correction value calculating section 50 obtains average values of all R, G and B pixels in the photographing screen by using image signal data (step S401). Subsequently, the values of m' and n' are calculated from the respective average values of the R, G and B pixels in the overall photographing screen (m'=R·B, n'=G/(B·R)). Further, the evaluation values m and n are obtained from the above equations (3) and (4) (step S402).

Subsequently, it is determined whether m>2 (step S403). If m>2, it is determined whether n<1, and if n<1, the flow advances to a step S405. If n≧1, the flow advances to a step S409.

In the step S405, since m>2 and n<1, the R output is twice or more than that in the standard state, it is determined that the light source is a tungsten lamp. Therefore, the chromatic correction data Hit is selected (Hi=Hit).

If m≦2 in the step S403, it is determined that whether m<1 (S406). If m≧1, the flow advances to a step S409. If m<1, the flow advances to a step S407.

In the step S407, it is determined whether n>2. If n>2, the flow advances to a step S408. If n≦2, the flow advances to a step S409. In the step S408, since m<1 and n>2, that is, the G output is twice or more than that in the standard state, it is determined that the light source is a fluorescent lamp. Therefore, the chromatic aberration correction data Hif for a fluorescent lamp is selected (Hi=Hif).

In the step S409, it is determined that the light source is other than a tungsten lamp or a fluorescent lamp, i.e., the sunlight or the like. In this case, the chromatic aberration correction data is set to 0 (Hi=0). The chromatic aberration correction value calculation is thus completed. The chromatic aberration correction data Hi obtained by the calculation is transmitted from the body microcomputer 41 to the lens microcomputer 31 and used to correct chromatic aberration in the focus adjustment time.

A second embodiment of the present invention will be described below.

FIG. 17 is a diagram showing a structure of an optical system of a digital camera according to a second embodiment of the present invention.

As shown in FIG. 17, the digital camera of this embodiment has an interchangeable lens 30 and a camera body 40.

The interchangeable lens 30 includes a photographing optical system 11 having a focus adjusting lens 11a and the like, a lens stop 12, etc. An optical light beam passed through the photographing optical system 11 and guided into the camera body is split into two parts by a beam splitter 21. A part of the beam is guided to an imaging element CCD 24 through an infrared cut filter 22 for cutting an infrared component and an optical LPF 23 for reducing moiré fringes.

The other part of the light beam is reflected by a mirror 29 and thereafter guided to a focus detecting section 15. The focus detecting section 15, using a phase contrast detecting method, comprises a focus detecting optical system 16 and an AF sensor 17. The focus detecting section 15 has a plurality of focus detecting areas. The focus detecting areas 201, 202 and 203 are arranged in positions as shown in FIG. 18.

The camera body further comprises an electronic view finder including a display section 46 and an eyepiece 28.

FIG. 18 is a diagram showing a layout of an imaging screen.

An imaging plane 200 of the imaging element CCD 24, the focus detecting areas 201, 202 and 203 in the imaging screen, and image signal regions 204, 205 and 206 for use in color temperature detection are arranged as shown in FIG. 18.

The color temperature detecting regions 204, 205 and 206 are designed to respectively include the focus detecting areas 201, 202 and 203.

The chromatic aberration correction value calculating section 50 calculates color temperature evaluation values based on image signals in the color temperature detecting regions 204, 205 and 206. Chromatic aberration correction values are obtained from the calculated color temperature evaluation values.

The focus detecting section 15 detects an amount of defocus in respect of each of the focus detecting areas 201, 202 and 203 and corrects it using the chromatic aberration correction value obtained as described above. The corrected amount of defocus, in which the chromatic aberration is corrected, is transmitted from the body microcomputer 41 to the lens microcomputer 31. The lens microcomputer 31 executes focus adjustment based on the corrected amount of defocus.

Figure 19:
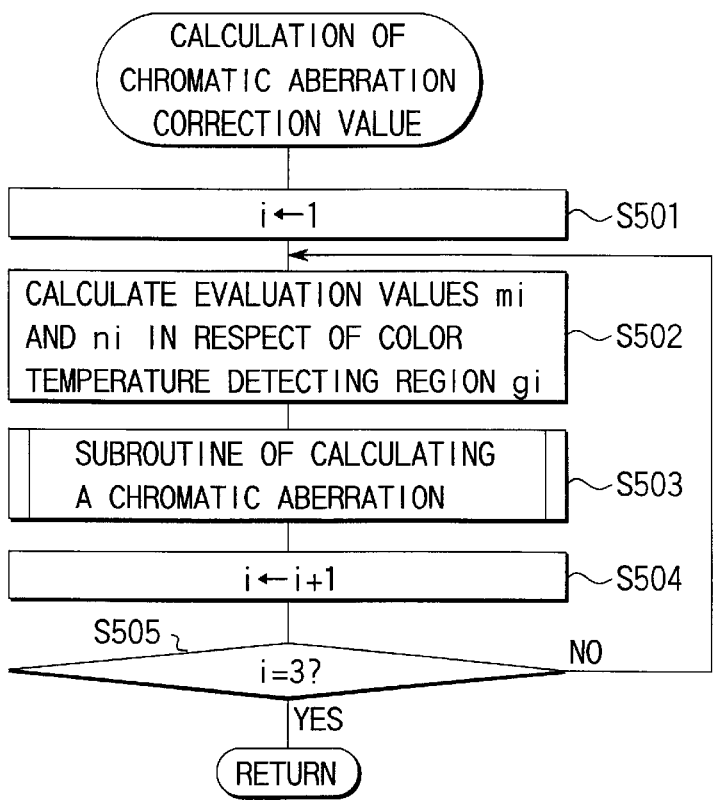
FIG. 19 is a flowchart for explaining a sequence of calculation of a chromatic aberration correction value executed in the digital camera of the second embodiment.

The sequence of the calculation of a chromatic aberration correction value, executed by the digital camera of the second embodiment, will be described in detail with reference to the flowchart of FIG. 19.

The EEPROM 31e of the interchangeable lens 30 stores amounts of chromatic aberration g1, g2 and g3 of the respective focus detection areas of a monochromatic light source of 800 nm relative to the light source of 550 nm (the sunlight). The amounts of chromatic aberration g1 to g3 are transmitted from the lens microcomputer 31 to the body microcomputer 41. The color temperature evaluation values m and n in respect of the color temperature detecting regions 204 (g1), 205 (g2) and 206 (g3) are calculated, thereby obtaining, m1, n1, m2, n2, m3 and n3.

When the main routine of the sequence starts, first, the numeral 1 is substituted for a variable i (step S501). Then, evaluation values mi and ni in respect of the color temperature detecting region gi are calculated (step S502). The evaluation values are obtained in the same manner as in the first embodiment described above.

Thereafter, subroutine "calculation of a chromatic aberration correction value" (to be described later in detail) is executed to calculate chromatic aberration correction data (step S503). The numeral i is incremented to designate a next color temperature detecting region (step S504). Then, it is determined whether the calculation is completed for all the regions (step S505). If it is not completed, the steps S502 to S505 are repeated. If the calculation for all the regions is completed, the sequence is returned.

Figure 20:
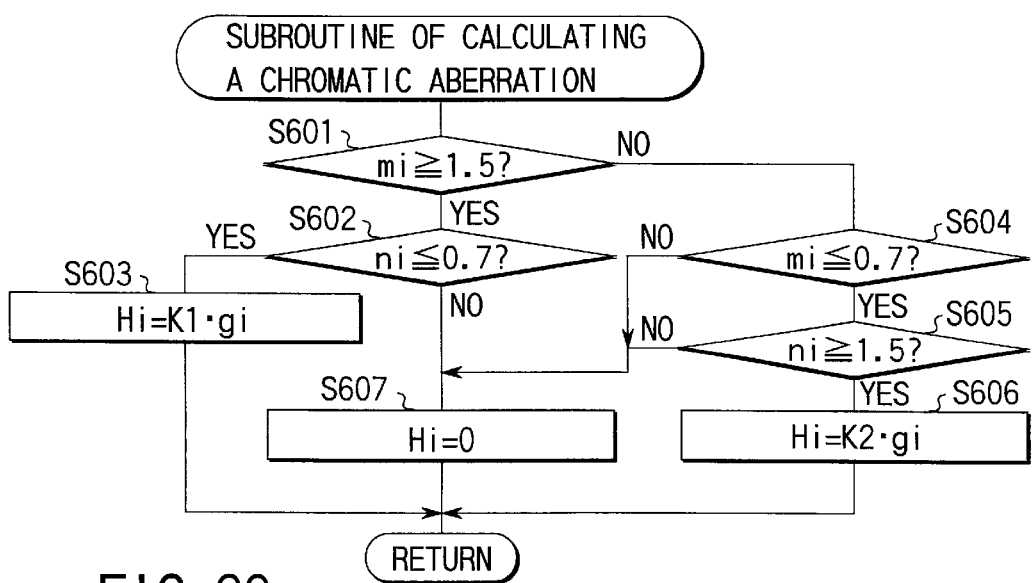
FIG. 20 is a flowchart for explaining a sequence of the subroutine "calculation of a chromatic aberration correction value".

The subroutine "calculation of a chromatic aberration correction value" will now be described with reference to the flowchart shown in FIG. 20.

When the subroutine of the sequence starts, first, it is determined whether mi≧1.5 (step S601). If mi≧1.5, the flow advances to a step S602, in which it is determined whether ni≦0.7. If mi≧1.5 and ni≦0.7, it is determined that the incident light from the object includes a lot of long-wavelength components and the color temperature is low. In this case, the amount of chromatic aberration gi is multiplied by a predetermined coefficient k1, with the result that color temperature correction data Hi(=k1·gi) is obtained (step S603).

In the step S601, if mi<1.5, the flow advances to a step S604, in which it is determined whether mi≦0.7. If mi≦0.7, the flow advances to a step S605, in which it is determined whether ni≧1.5. If mi≦0.7 and ni≧1.5, it is determined that the incident light from the object includes a lot of short-wavelength components and the color temperature is low. In this case, the amount of chromatic aberration gi is multiplied by a predetermined coefficient −k2, with the result that color temperature correction data Hi(=k2·gi) is obtained (step S606).

In a step S607, it is determined that the incident light from the object has components approximate to the sunlight, and that chromatic aberration correction is not required. In this case, the color temperature correction data Hi is set to 0. Thus, the calculation of chromatic aberration correction data Hi is completed.

As described above, the focus detecting area determines the color temperature correction value Hi based on the image signal in the corresponding region of the imaging element CCD 24. The color temperature correction value Hi is added to the amount of defocus Dfi for every focus detecting area corresponding to the sunlight obtained by the focus detecting operation of the body microcomputer 41, thereby calculating a corrected amount of defocus Dfi' for every focus detecting area. Thereafter, a focus detecting area is selected to perform focus adjustment in accordance with the predetermined focus detecting area selecting algorithm (e.g., closest selection) in respect of the corrected amount of defocus.

According to the second embodiment, the color temperature detecting regions for the respective focus detecting areas, as described above, individually perform color temperature detection, thereby obtaining chromatic aberration correction data. Therefore, the chromatic aberration can be corrected more accurately.

The evaluation values m and n are not limited to determinations as mentioned above but can be variously modified. Further, the number of focus detecting areas are limited to three but may be four or more.

As described above, according to the present invention, the amount of correction of chromatic aberration is determined on the basis of an output from an imaging element for imaging an object. Therefore, a focus adjustment operation can be performed accurately, not influenced by chromatic aberration, without additionally requiring a color temperature detection sensor, a detection circuit and an optical system, while costs are not substantially increased or an additional space is not particularly required.

As has been described above, the present invention can provide a digital camera having a low-cost and space-saving focus adjusting apparatus which accurately performs focus adjustment by correcting chromatic aberration in focus detecting operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera including a photographing lens and a color imaging element for receiving an object light beam passed through the photographing lens and converting the object light beam into an electrical signal, comprising:
   an autofocus sensor for receiving an object light beam passed through the photographing lens;
   a focus detecting apparatus for detecting a-focus adjusting state of the photographing lens based on an output from the autofocus sensor;
   an image signal processing section for processing the electrical signal output from the color imaging element and generating an image signal;
   a correction calculating circuit for calculating, based on the image signal output from the image signal processing section, a correction value for correcting a detection error due to chromatic aberration of the focus detecting apparatus; and
   a lens driving apparatus for driving the photographing lens based on an output from the focus detecting apparatus and an output from the correction calculating circuit.

2. A camera according to claim 1, wherein the correction calculating circuit calculates the correction value by evaluating a kind of a light source which illuminates an object.

3. A camera according to claim 1, wherein the correction calculating circuit calculates the correction value by evaluating a color temperature of a light source which illuminates an object.

4. A camera according to claim 1, wherein the correction calculating circuit calculates the correction value by using a plurality of evaluation values.

5. A camera according to claim 1, wherein the color imaging element includes an infrared cut filter for cutting an infrared component from light that passes through the infrared cut filter, and wherein the color imaging element is different from the autofocus sensor.

6. The camera according to claim 1, wherein the color imaging element is adapted to capture an image to be stored as a photographed image.

7. A camera comprising:
   a focus detecting light-receiving sensor for receiving an object light beam passed through a photographing lens and a separator lens;
   a focus detecting circuit for detecting a focus state of the photographing lens based on an output from the focus detecting light-receiving sensor;
   a color imaging element for receiving the object light beam passed through the photographing lens and converting the object light beam into an electrical signal;
   an image signal processing section for processing the electric signal output from the color imaging element and generating an image signal;
   a correcting circuit for correcting the image signal output from the focus detecting circuit based on the image signal of the image signal processing section; and
   a control circuit for performing focus adjustment based on an output from the correction circuit.

8. A camera according to claim 7, wherein the correction circuit comprises:
   a color temperature detecting circuit for detecting data on a color temperature based on the imaging output of the imaging element; and
   a correction value calculating circuit for calculating a chromatic aberration correction value based on an output from the color temperature detecting circuit.

9. A camera according to claim 7, wherein:
   the focus detecting light-receiving sensor has a plurality of light receiving regions corresponding to a plurality of focus detecting regions of an imaging plane;
   the focus detecting circuit has a plurality of focus detecting sections corresponding to said plurality of focus detecting regions; and
   the correcting circuit corrects outputs of said plurality of focus detecting sections based on imaging outputs of regions of the imaging element corresponding to said plurality of focus detecting regions.

10. A camera according to claim 7, wherein the color imaging element includes an infrared cut filter for cutting an infrared component from light that passes through the infrared cut filter, and wherein the color imaging element is different from the focus detecting light-receiving sensor.

11. The camera according to claim 7, wherein the color imaging element is adapted to capture an image to be stored as a photographed image.

12. A camera including a photographing lens and a color imaging element for receiving an object light beam passed through the photographing lens and converting the object light beam into an electrical signal, comprising:
   an autofocus sensor for receiving an object light beam passed through the photographing lens;
   focus detecting means for detecting a focus adjusting state of the photographing lens based on an output from the autofocus sensor;
   an image signal processing section for processing the electric signal output from the color imaging element and generating an image signal;
   correction calculating means for calculating, based on the image signal output from the image signal processing section, a correction value for correcting a detection error due to chromatic aberration of the focus detecting means; and a lens driving apparatus for driving the photographing lens based on an output from the focus detecting means and an output from the correction calculating means.

13. A camera according to claim 12, wherein the color imaging element includes an infrared cut filter for cutting an infrared component from light that passes through the infrared cut filter, and wherein the color imaging element is different from the autofocus sensor.

14. The camera according to claim 12, wherein the color imaging element is adapted to capture an image to be stored as a photographed image.

15. A camera comprising:

a focus detecting light-receiving sensor for receiving an object light beam passed through a photographing lens and a separator lens;

focus detecting means for detecting a focus state of the photographing lens based on an output from the focus detecting light-receiving sensor;

a color imaging element for receiving the object light beam passed through the photographing lens and converting the object light beam into an electrical signal;

an image signal processing section for processing the electric signal output from the color imaging element and generating an image signal;

correcting means for correcting an output from the focus detecting means based on the image signal of the image signal processing section; and control means for performing focus adjustment based on an output from the correcting means.

16. A camera according to claim 15, wherein the color imaging element includes an infrared cut filter for cutting an infrared component from light that passes through the infrared cut filter, and wherein the color imaging element is different from the focus detecting light-receiving sensor.

17. The camera according to claim 15, wherein the color imaging element is adapted to capture an image to be stored as a photographed image.

18. A camera having an autofocus apparatus, comprising:

an autofocus sensor for receiving an object light beam passed through a photographing lens;

defocus calculating means for calculating an amount of defocus based on an output from the autofocus sensor;

a memory for storing a plurality of correction values to correct a detection error due to chromatic aberration of the autofocus apparatus;

a color imaging element for receiving the object light beam passed through the photographing lens and converting the object light beam into an electric signal;

an image signal processing section for processing the electric signal output from the color imaging element and generating an image signal;

selecting means for selecting at least one of said plurality of correction values stored in the memory based on the image signal of the image signal processing section;

defocus correcting means for correcting the amount of defocus by the correction value selected by the selecting means; and a lens driving apparatus for driving the photographing lens based on an output from the defocus correcting means.

19. A camera according to claim 18, wherein the color imaging element includes an infrared cut filter for cutting an infrared component from light that passes through the infrared cut filter, and wherein the color imaging element is different from the autofocus sensor.

20. The camera according to claim 18, wherein the color imaging element is adapted to capture an image to be stored as a photographed image.

21. An autofocus apparatus of a camera, comprising:

an autofocus sensor;

defocus calculating means for calculating an amount of defocus based on an output from the autofocus sensor;

a memory for storing a plurality of correction values to correct a detection error due to chromatic aberration of the autofocus sensor;

a color imaging element for receiving an object light beam passed through a photographing lens and converting the object light beam into an electric signal;

an image signal processing section for processing the electric signal output from the color imaging element and generating an image signal;

color temperature determining means for determining a color temperature of an object light beam based on the image signal of the image processing section;

selecting means for selecting at least one of said plurality of correction values stored in the memory based on an output from the color temperature determining means; and defocus correcting means for correcting the amount of defocus by the correction value selected by the selecting means.

22. An autofocus apparatus according to claim 21, wherein the color imaging element includes an infrared cut filter for cutting an infrared component from light that passes through the infrared cut filter, and wherein the color imaging element is different from the autofocus sensor.

23. The auto focus apparatus according to claim 21, wherein the color imaging element is adapted to capture an image to be stored as a photographed image.

24. A camera comprising:

a photographing lens for focusing an object light beam;

a color imaging element for receiving the object light beam passed through the photographing lens and converting the object light beam into an electric signal;

an autofocus sensor for receiving the object light beam passed through the photographing lens;

a focus detecting section for detecting a focus adjusting state of the photographing lens based on an output from the autofocus sensor;

an image signal processing section for processing the electric signal output from the color imaging element and generating an image signal;

a correcting section for correcting a detection error due to chromatic aberration of the focus detecting section based on the image signal of the image signal processing section; and a lens driving section for driving the photographing lens based on an output from the focus detecting section and an output from the correcting section.

25. The camera according to claim 24, wherein the correcting section calculates a chromatic aberration correction value based on a ratio m of a variable representing a ratio of an R output to a B output of the color imaging element to a variable representing a ratio of an R output to a B output of a standard light source and a ratio n of a variable representing a ratio of a G output and B and R outputs of the color imaging element to a variable representing a ratio of a G output and B and R outputs of the standard light source.

26. A camera according to claim 25, further comprising a storing section which prestores the variable m0 representing the ratio of the R output to the B output of the standard light source and the variable n0 representing the ratio of the G output and the B and R outputs of the standard light source.

27. A camera according to claim 24, wherein the color imaging element includes an infrared cut filter for cutting an infrared component from light that passes through the infrared cut filter, and wherein the color imaging element is different from the autofocus sensor.

28. The camera according to claim 24, wherein the color imaging element is adapted to capture an image to be stored as a photographed image.

29. A camera comprising:

a photographing lens for focusing an object light beam;

a color imaging element for receiving the object light beam passed through the photographing lens and converting the object light beam into an electric signal;

an autofocus sensor for receiving the object light beam passed through the photographing lens;

a focus detecting section, having a plurality of focus detecting areas, for detecting a focus adjusting state of the photographing lens based on an output from the autofocus sensor in each area;

an image signal processing section for processing the electric signal output from the color imaging element and generating an image signal;

a correcting section for calculating a color temperature evaluation value based on the image signal of the image signal processing section corresponding to a color temperature detecting region of the color imaging element, and calculating a chromatic aberration correction value for correcting a detection error due to chromatic aberration of the focus detecting section based on the color temperature evaluation value; and a lens driving section for driving the photographing lens based on an output from the focus detecting section and an output from the correcting section.

30. A camera according to claim 29, wherein the color imaging element includes an infrared cut filter for cutting an infrared component from light that passes through the infrared cut filter, and wherein the color imaging element is different from the autofocus sensor.

31. The camera according to claim 29, wherein the color imaging element is adapted to capture an image to be stored as a photographed image.

* * * * *